United States Patent
Fautz et al.

(10) Patent No.: US 12,548,123 B2
(45) Date of Patent: Feb. 10, 2026

(54) DETERMINING CORRECT OPERATION OF A RECEIVING SYSTEM OF A MAGNETIC RESONANCE DEVICE FOR GENERATING MAGNETIC RESONANCE IMAGES AND REDUCING NOISE ON THE MAGNETIC RESONANCE IMAGES

(71) Applicant: Siemens Healthineers AG, Forchheim (DE)

(72) Inventors: Hans-Peter Fautz, Forchheim (DE); Stephan Kannengiesser, Wuppertal (DE); Jeanette Lenger, Würzburg (DE)

(73) Assignee: Siemens Healthineers AG, Forchheim (DE)

( * ) Notice: Subject to any disclaimer, the term of this patent is extended or adjusted under 35 U.S.C. 154(b) by 343 days.

(21) Appl. No.: 17/944,356

(22) Filed: Sep. 14, 2022

(65) Prior Publication Data
US 2023/0081688 A1    Mar. 16, 2023

(30) Foreign Application Priority Data
Sep. 14, 2021  (DE) .......................... 102021210163.1

(51) Int. Cl.
| | |
|---|---|
| *G06T 5/00* | (2024.01) |
| *A61B 5/055* | (2006.01) |
| *G06T 5/70* | (2024.01) |
| *G06K 7/08* | (2006.01) |

(52) U.S. Cl.
CPC ............... *G06T 5/70* (2024.01); *A61B 5/055* (2013.01); *G06K 7/084* (2013.01); *G06T 2207/10088* (2013.01)

(58) Field of Classification Search
None
See application file for complete search history.

(56) References Cited

U.S. PATENT DOCUMENTS

| | | | |
|---|---|---|---|
| 8,634,623 B2* | 1/2014 | Schmitt | G06T 5/94 382/131 |
| 2007/0198203 A1* | 8/2007 | Kimura | C12N 15/111 702/85 |
| 2013/0188851 A1* | 7/2013 | Miyasa | G06T 7/30 382/131 |
| 2016/0084929 A1* | 3/2016 | Dale | A61B 5/055 324/309 |

(Continued)

OTHER PUBLICATIONS

Questions and Answers in MRI: MRI Quality Control: SNR. Veröffentlichungsdatum: Jun. 5, 2021. Quelle (URL:https://mriquestions.com/signal-to-noise.html).

*Primary Examiner* — Haris Sabah
(74) *Attorney, Agent, or Firm* — Banner & Witcoff, Ltd.

(57) ABSTRACT

A computer-implemented method for determining correct operation of a receiving system of a magnetic resonance device using of a magnetic resonance measurement, by: acquiring a magnetic resonance image using the receiving system during the magnetic resonance measurement, determining a noise distribution of the acquired magnetic resonance image by means of a computing unit, and determining correct operation of the receiving system by means of the computing unit on the basis of the noise distribution. Also, a magnetic resonance device, having a computing unit which is designed to coordinate the computer-implemented method and execute the by means of the magnetic resonance device.

12 Claims, 4 Drawing Sheets

(56) References Cited

U.S. PATENT DOCUMENTS

| | | |
|---|---|---|
| 2019/0146048 A1 | 5/2019 | Kannengiesser et al. |
| 2019/0195977 A1 | 6/2019 | de Oliveira et al. |
| 2020/0286214 A1* | 9/2020 | Kaneko ................ G06T 11/003 |
| 2021/0072331 A1* | 3/2021 | Otake ................ G01R 33/3642 |

* cited by examiner

DETERMINING CORRECT OPERATION OF A RECEIVING SYSTEM OF A MAGNETIC RESONANCE DEVICE FOR GENERATING MAGNETIC RESONANCE IMAGES AND REDUCING NOISE ON THE MAGNETIC RESONANCE IMAGES

TECHNICAL FIELD

The disclosure relates to a method for determining that a receiving system of a magnetic resonance device is operating correctly.

BACKGROUND

Magnetic resonance tomography is a well-known method for generating magnetic resonance images of the interior of an object under examination. To perform a magnetic resonance measurement, the object under examination is usually positioned in a powerful, static and homogeneous main magnetic field (B0 field) of a magnetic resonance device. The main magnetic field can have magnetic field strengths of 0.2 to 7 Tesla, so that nuclear spins of the object under examination are oriented along the main magnetic field. In order to trigger so-called nuclear spin resonances, radiofrequency signals known as excitation pulses (B1 magnetic field) are applied to the object under examination. Each excitation pulse causes the magnetization of particular nuclear spins of the object under examination to deviate from its ground state, which deviation can be described by a flip angle. An excitation pulse can have an alternating magnetic field with a frequency corresponding to the Larmor frequency at the respective static magnetic field strength. The excited nuclear spins can exhibit a rotating and decaying magnetization (nuclear spin resonance) which can be detected as a magnetic resonance signal by means of special antennas. Magnetic gradient fields can be superimposed on the main magnetic field to spatially encode the nuclear magnetic resonances of the object under examination.

The received magnetic resonance signals are typically digitized and stored as complex values in a k-space matrix as image data. This k-space matrix can be used as the basis for reconstructing magnetic resonance images as well as for determining spectroscopy data. The magnetic resonance image is typically reconstructed by means of a multidimensional Fourier transform of the k-space matrix.

To ensure that the magnetic resonance device is operating correctly, quality assurance is carried out, which typically involves performing a magnetic resonance measurement using predefined parameter sets, such as, for example, particular service imaging sequences as well as using phantoms. These quality assurance measures are preferably repeated at predefined time intervals. Values acquired during quality assurance by means of the magnetic resonance measurement, such as, for example, magnetic resonance images or image data, are frequently compared with global benchmarks to determine whether the receiving system and/or individual components of the receiving system meet a predefined specification.

A magnetic resonance image may be subject to undesirable effects. Such effects may be due to thermal noise, but also to other factors, both external in nature and caused by the patient. There are numerous reasons for the presence of noise in a magnetic resonance image. These include defective or unselected local coils, defective and/or ageing electronic components of the receiving system, but also downstream processing steps for the magnetic resonance images or image data. The challenge is basically to ascertain whether a noise in an acquired magnetic resonance image corresponds to an expected noise or whether there is a fault. The noise depends not only on the antenna arrangement used and the electronic components of the receiving system. The imaging sequence employed, especially when parallel imaging is used, can also significantly contribute to noise when a plurality of antennas are used for spatial encoding of magnetic resonance signals during the magnetic resonance measurement.

In practice, quality assurance is usually performed using a phantom and a specific service imaging sequence. The magnetic resonance images and/or image data obtained can then be compared with system-specific and/or antenna-specific data. More recent techniques, such as the AI-based Coil Companion, have partially removed the limitation of using a phantom, for example by evaluating data or metadata from a patient measurement. Although data for quality assurance is also evaluated on a random basis here, e.g. for each localizer measurement, it allows more timely monitoring (e.g. for each patient). However, with the focus being on hardware or system errors, there is currently no provision for synchronous monitoring of each magnetic resonance image. This means that certain, in particular patient-dependent, error patterns, such as, for example, movement of a patient between the individual adjustments, are not taken into account.

SUMMARY

An object of the disclosure is to simplify and/or improve quality assurance implementation.

The method according to the disclosure for determining correct operation of a receiving system of a magnetic resonance device by means of a magnetic resonance measurement comprises:
  acquiring a magnetic resonance image by means of the receiving system during the magnetic resonance measurement,
  determining a noise distribution of the acquired magnetic resonance image by means of a computing unit, and
  determining correct operation of the receiving system by means of the computing unit on the basis of the noise distribution.

A magnetic resonance measurement can be understood as any operation in which magnetic resonance signals of an object under examination are acquired by means of the receiving system of the magnetic resonance device. The magnetic resonance signals can subsequently be processed by means of a computing unit of the magnetic resonance device to reconstruct a magnetic resonance image of an object under examination. The acquired magnetic resonance signals are preferably sorted as image data or rather k-space data and converted into magnetic resonance images by means of a two-step Fourier transform. In particular, the magnetic resonance images can comprise two-dimensional, three-dimensional and/or time-dependent images of the interior of the object under examination.

The magnetic resonance measurement can comprise one or more imaging sequences, in particular a dedicated succession of imaging sequences. An imaging sequence can include one or more parameters, referred to as imaging parameters. Examples of typical imaging parameters include image resolution, contrast, slice thickness, field of view, and the like. A plurality of said imaging parameters can form a so-called parameter set which characterizes the imaging sequence. The magnetic resonance measurement preferably includes one or more imaging sequences that are particularly suitable or optimized for determining correct operation of the receiving system. It is conceivable for the imaging sequence and/or parameter set to be standardized to replicate a predefined noise and/or noise distribution.

The receiving system of the magnetic resonance device comprises at least one antenna which is designed to receive magnetic resonance signals from the object under examination. The receiving system preferably comprises further components, such as, for example, electrical connecting cables, a receiving unit, an input amplifier or the like. In particular, the computing unit which processes and/or reconstructs magnetic resonance images on the basis of the acquired magnetic resonance signals can also be considered part of the receiving system.

In a step of the method according to the disclosure, a magnetic resonance image is acquired by means of the receiving system during the magnetic resonance measurement. In this case, magnetic resonance signals which have been acquired by means of an antenna can be transmitted to a receiving unit, in particular a preamplifier, by means of a signal link. The signal link can be hard-wired, e.g. as an electrical connecting cable, but also wireless. The acquired magnetic resonance signal can also be transmitted to the computing unit of the magnetic resonance device in order to reconstruct the magnetic resonance image.

In one aspect, the magnetic resonance image is acquired from an object under examination using predefined characteristics, in particular a predefined signal level. The object under examination can be, e.g., a phantom or a reference object. However, in a preferred aspect, the magnetic resonance measurement is performed on a patient. Imaging sequences used in this process can in particular be tailored to a magnetic resonance measurement of a diagnostically relevant body region of the patient.

In a further step of the method according to the disclosure, the noise distribution of the acquired magnetic resonance image is determined by means of the computing unit. A noise distribution can comprise, for example, a two- or three-dimensional distribution of signal intensities. The noise can be characterized by spatially resolved signal intensities, but in particular also by local variances of the spatially resolved signal intensities, of the acquired magnetic resonance image. In addition, the noise distribution can also comprise a standard deviation and/or a comparable statistical or averaged quantity, which can be used for evaluating the noise quality. The noise distribution preferably comprises standard deviations of signal values of a magnetic resonance image which are assigned to pixels and/or voxels.

The computing unit can have a suitable image processing algorithm designed to determine the noise distribution of the acquired magnetic resonance image. It is conceivable for the computing unit to determine the noise distribution and/or a characteristic of the noise on the basis of k-space coordinates of the acquired magnetic resonance image. In addition, the noise distribution of the acquired magnetic resonance image can also be determined on the basis of a comparison of the acquired magnetic resonance image with an artificial magnetic resonance image that is ideally noise-free or has a low noise level. A noise level can be characterized, for example, by a variance. It is also conceivable for a noise level to be characterized by a mean signal intensity of the noise and/or a maximum signal level of the noise.

According to a further step of the method according to the disclosure, correct operation of the receiving system is determined by means of the computing unit on the basis of the noise distribution. Correct operation of the receiving system can be determined in particular on the basis of a comparison of the noise distribution with an expected noise distribution and/or a reference noise distribution.

The method according to the disclosure provides a means of automatically analyzing the quality of acquired magnetic resonance images and/or monitoring correct operation of the receiving system of the magnetic resonance device. In addition, it provides continuous quality assurance which can also advantageously take patient-specific effects into account.

In one aspect, the method according to the disclosure further comprises:
applying a noise reduction method to the acquired magnetic resonance image and providing a noise-reduced magnetic resonance image by means of the computing unit,
wherein determining the noise distribution of the acquired magnetic resonance image involves determining a deviation between the acquired magnetic resonance image and the noise-reduced magnetic resonance image, and wherein correct operation of the receiving system is determined on the basis of the deviation between the acquired magnetic resonance image and the noise-reduced magnetic resonance image.

A noise reduction method can include any method that reduces noise in the acquired magnetic resonance image. The computing unit preferably has an image processing algorithm that reduces noise on the basis of signal intensities of pixels of the magnetic resonance image. In a preferred aspect, acquiring the magnetic resonance image involves a magnetic resonance measurement of a diagnostically relevant region of a patient's body. The noise reduction method can also be performed on the basis of noise-eliminated magnetic resonance images, segmented magnetic resonance images, and/or geometric representations of the diagnostically relevant region of the patient's body. This allows the effect of structured noise, for example, due to patient movement, ghosting, but also filtering and/or image reconstruction, to be separated from random image noise, which can be primarily due to thermal effects.

The noise distribution is preferably determined by taking the difference between signal intensities of the acquired magnetic resonance image and the noise-reduced magnetic resonance image. The determined noise distribution can then be used for determining correct operation of the receiving system of the magnetic resonance device.

A noise-reduced magnetic resonance image can advantageously be provided or generated even while the magnetic resonance measurement of the diagnostically relevant body region of the patient is in progress. This avoids the use of a phantom, and quality assurance can advantageously be performed synchronously with the magnetic resonance measurement.

According to another aspect of the method according to the disclosure, determining the noise distribution of the acquired magnetic resonance image involves determining a deviation of the acquired magnetic resonance image from an artificial magnetic resonance image, wherein the artificial magnetic resonance image is determined by means of
a simulation of an imaging sequence of the magnetic resonance measurement and/or
an intelligent algorithm on the basis of the acquired magnetic resonance image,
wherein correct operation of the receiving system is determined on the basis the deviation between the acquired magnetic resonance image and the artificial magnetic resonance image.

In particular, an artificial magnetic resonance image is a magnetic resonance image that is acquired or generated independently of a magnetic resonance signal. The artificial magnetic resonance image can have characteristics of a low-noise magnetic resonance image. However, it is equally conceivable for the artificial magnetic resonance image to comprise a representation (e.g. a template) of an anatomy of the diagnostically relevant body region which is characterized by signal intensities of a set of pixels or voxels.

In one aspect, the artificial magnetic resonance image is generated using simulation. A simulation can comprise, for example, a discrete solution of Bloch equations. In particular, the simulation can include assumptions for tissue properties that are determined on the basis of the acquired magnetic resonance image. The Bloch simulation can be performed on the basis of or taking into account a parameter set of the imaging sequence or rather the magnetic resonance measurement. In particular, it is conceivable for regions with different tissues to be segmented in the acquired magnetic resonance image. The different tissues can be assigned tissue properties that are used as input variables and/or boundary conditions of the simulation.

In one aspect, the artificial magnetic resonance image is created using an intelligent algorithm on the basis of the acquired magnetic resonance image. An intelligent algorithm can mean any application of artificial intelligence. For example, artificial intelligence can include a self-learning algorithm, a neural network, an expert system, an optimization method, or the like. The intelligent algorithm is preferably designed as a trained neural network, such as, for example, a multilayer neural network or a convolutional neural network. In particular, the neural network can be trained to generate the artificial magnetic resonance image based on the acquired magnetic resonance image.

It is further conceivable for the artificial magnetic resonance image to be created by means of a combination of a simulation and the application of an intelligent algorithm. For example, the artificial magnetic resonance image created using a neural network can be supplemented or complemented by a Bloch simulation.

Creating an artificial magnetic resonance image obviates the need to use a phantom, and quality assurance can advantageously be performed synchronously with the magnetic resonance measurement. Moreover, correct operation of the receiving system can be advantageously executed independently of the presence of reference values of other or comparable magnetic resonance measurements and/or imaging sequences. This can have advantages particularly when patient-specific and/or magnetic resonance measurements of rarely examined diagnostically relevant body regions are performed.

In one aspect of the method according to the disclosure, determining the noise distribution of the acquired magnetic resonance image involves filtering an image frequency from k-space data of the acquired magnetic resonance image.

It is conceivable that the filtering of an image frequency removes from k-space those frequencies that correspond to typical frequencies of noise in a magnetic resonance image. Depending on the filtered k-space data, a frequency-filtered magnetic resonance image can then be generated. For example, to determine the noise distribution, the difference between the acquired magnetic resonance image and the frequency-filtered magnetic resonance image can be determined.

However, it is equally conceivable for image frequencies that correspond to known or predefined frequencies of atomic nuclei of the tissue of the diagnostically relevant body region of the patient to be filtered out of the k-space data. The magnetic resonance image determined on the basis of the filtered k-space data thus essentially contains noise and incorporates the noise distribution of the acquired magnetic resonance image.

Filtering image frequencies from the k-space data represents another way to avoid the use of a phantom and provide monitoring of the receiving system on the basis of magnetic resonance measurements of diagnostically relevant body regions of patients. This advantageously saves additional time spent performing quality assurance in addition to magnetic resonance measurements of patients, but also takes into account the effect of the patient on correct operation of the receiving system.

In a preferred aspect, the method according to the disclosure further comprises:
  determining an expected noise distribution of the acquired magnetic resonance image,
  wherein correct operation of the receiving system is determined on the basis of a deviation between the noise distribution of the acquired magnetic resonance image and the expected noise distribution of the acquired magnetic resonance image.

In particular, the expected noise distribution can be determined on the basis of known or predefined information. Such known or predefined information can include, for example, a structure of the receiving system, a number and/or arrangement of antennas used, a known reception behavior of the antennas, a known noise behavior of a preamplifier, or the like. The computing unit can determine the expected noise distribution on the basis of the known or predefined information.

In one aspect, the expected noise distribution of the acquired magnetic resonance image is determined on the basis of at least one of the following: a decorrelation matrix, a sensitivity map of an antenna of the receiving system, a reference line of a parallel imaging technique, or an imaging parameter of the magnetic resonance measurement.

A sensitivity map of an antenna of the receiving system can vary depending on the positioning of the antenna at the diagnostically relevant body region of the patient, since the distance of a section of the antenna from the diagnostically relevant body region can affect noise. In addition, the signal level of an antenna can decrease with increasing distance of the antenna from the diagnostically relevant body region, thereby reducing the signal-to-noise ratio. Therefore, different sensitivity maps can be used or assumed depending on the diagnostically relevant body region. The sensitivity maps can also provide information for expected noise of a specific antenna or a specific arrangement of antennas at a specific body region.

However, the expected noise distribution can also be determined on the basis of a reference line of a parallel imaging technique or an imaging parameter of the magnetic resonance measurement. For example, the expected noise distribution can be interpolated or extrapolated depending on a database of reference noise distributions as a function of an imaging parameter or parameter set. For example, the database of reference noise distributions can comprise a plurality of determined noise distributions obtained under standardized conditions on the basis of predefined parameter sets, number and/or arrangements of antennas, diagnostically relevant body regions of patients, temperatures, or the like.

A decorrelation matrix can be based in particular on a noise calibration measurement. Such a noise calibration measurement can be routinely performed by the magnetic resonance device for quality assurance purposes. The expected noise distribution is preferably determined on the basis of the decorrelation matrix taking processing steps for reconstruction of the magnetic resonance image into account. In addition, in the case of parallel imaging, reconstruction coefficients can be used which are determined on the basis of the reference lines.

Correct operation of the receiving system is preferably determined by determining the difference between the noise distribution of the magnetic resonance image and the expected noise distribution of the magnetic resonance image. The noise distribution of the magnetic resonance image can be determined as per an aspect described above.

By determining an expected noise distribution as per an aspect described above, the noise distribution can be determined in a particularly time-efficient and/or easy-to-implement manner.

In a further aspect of the method according to the disclosure, correct operation of the receiving system is determined on the basis of a deviation between the noise distribution of the acquired magnetic resonance image and a reference noise distribution, wherein the reference noise distribution comprises a known noise distribution for a specific parameter set of the magnetic resonance measurement.

As described above, the reference noise distribution can represent a noise distribution determined on the basis of standardized boundary conditions, such as, for example, a specific parameter set, a specific number and/or arrangement of antennas, a specific diagnostically relevant body region of a patient, a specific image processing and/or image reconstruction method, a specific temperature, or the like. In particular, the reference noise distribution can comprise empirical values or values which have been empirically determined. The boundary conditions of the magnetic resonance measurement preferably match boundary conditions of a reference magnetic resonance measurement on which the reference noise distribution is based. However, it is equally conceivable for the reference noise distribution to be interpolated, extrapolated and/or determined using a classification method, such as nearest neighbor classification, on the basis of one or more boundary conditions from a database of reference noise distributions with predefined boundary conditions.

By using the reference noise distribution, the noise distribution of the acquired magnetic resonance image can be advantageously correlated with a reference noise distribution acquired at an earlier time. As a result, time-related effects such as, for example, degradation of components of the receiving system and/or variable time-related behavior of electronic components can be taken into account and/or quantified when determining correct operation of the receiving system.

In another aspect of the method according to the disclosure, acquisition of the magnetic resonance image by the receiving system involves acquiring a magnetic resonance image of a phantom.

A phantom is usually employed in imaging procedures for artificially and repeatably producing a specific examination situation. Phantoms can be used, in particular, to check the proper functioning of a transmitting system, the receiving system, and the timing between the transmitting and receiving systems of the magnetic resonance device. The phantom preferably comprises a hollow base body which is filled with a medium. Such media are preferably suitable for generating sufficient magnetic resonance signals to obtain reproducible measured values in the shortest possible time. The hollow base body of the phantom is preferably filled with water, as this is a main component of the human body and has a permeability to electromagnetic waves comparable to that of human tissue. However, other magnetic resonance active materials such as, for example, substrates or media with signal-generating atomic nuclei, such as 1H, 3He, 7Li, 13C, 17O, 19F, 23Na, 31P and 129Xe, are also conceivable. In addition, the medium can be provided with additives to match certain properties, such as, for example, a relaxation time, to corresponding properties of human tissue.

The noise distribution of the acquired magnetic resonance image is also determined on the basis of a parameter set of the magnetic resonance measurement, wherein determining correct operation of the receiving system involves determining a signal-to-noise distribution for the parameter set of the magnetic resonance measurement on the basis of a predefined signal level of the phantom.

As described above, a parameter set can comprise one or more imaging parameters of the magnetic resonance measurement. However, it is equally conceivable for a parameter set to include a number and/or arrangement of antennas, a configuration of the receiving system, a type of a processing of acquired magnetic resonance signals (e.g. an image reconstruction algorithm, a noise reduction method, an image optimization method, etc.), a boundary condition of the magnetic resonance measurement described above, but also one or more imaging sequences or the like.

Determining the noise distribution of the acquired magnetic resonance image on the basis of the parameter set can mean that the parameter set is associated with the determined noise distribution and/or a characteristic of the determined noise distribution, such as, for example, maximum noise level, standard deviation, power level, local distribution of the noise (variance) or the like. In addition, a single parameter of the parameter set can also be associated with the determined noise distribution and/or to the characteristic of the determined noise distribution. The determined noise distribution and the parameter set can be stored in particular in the form of any data structure, such as, for example, a matrix, a value tuple, a vector or the like, on a memory unit.

The determined noise distribution is preferably correlated with a known signal level of the phantom in order to determine the signal-to-noise distribution for the parameter set of the magnetic resonance measurement. It is conceivable for the signal intensities of individual pixels or voxels of the determined noise distribution of the acquired magnetic resonance image to be referred to and/or correlated with a value of the predefined signal level. The predefined signal level can be determined e.g. based on the medium used and/or the quantity of magnetic resonance active atomic nuclei contained therein, as well as on the parameter set.

In one aspect, determining correct operation of the receiving system involves determining the signal and/or noise homogeneity of the acquired magnetic resonance image, wherein the signal-to-noise distribution for the parameter set of the magnetic resonance measurement is determined on the basis of the determined signal and/or noise homogeneity. A signal and/or noise homogeneity can in particular include a quantification of a local and/or time-related distribution of the noise, but also an index for the local and/or time-related distribution of the noise.

By determining signal-to-noise distributions, quality assurance results can be advantageously standardized and/or normalized, whereby different parameter sets or magnetic resonance measurements can be compared with one another and/or used for error analysis. As a result, a normal range of a current magnetic resonance measurement can also be advantageously assessed on the basis of signal-to-noise distributions of other parameter sets.

In one aspect of the method according to the disclosure, determining correct operation of the receiving system further involves determining a deviation between the predefined signal level of the phantom and a reference value of the signal level for the parameter set.

A reference value of the signal level can be an ideal signal level, which can be theoretically determined on the basis of the medium used or the quantity of magnetic resonance active atomic nuclei contained therein and the parameter set of the magnetic resonance measurement. In particular, however, it is conceivable for the reference value to be an average value or an empirical value of the signal level, which has been determined on the basis of a plurality of magnetic resonance measurements using a comparable or the same parameter set.

By determining a deviation between the predefined signal level of the phantom and the reference value of the signal level, correct operation of the receiving system can be assessed even before determining the signal-to-noise distribution. This can advantageously increase the time efficiency of the quality assurance. Moreover, possible errors of the receiving system can already be advantageously narrowed down to individual components of the receiving system on the basis of the deviation between the predefined signal level of the phantom and the reference value of the signal level.

According to another aspect of the method according to the disclosure, determining correct operation of the receiving system involves determining a deviation between the determined signal-to-noise distribution and the acquired magnetic resonance image.

Determining the deviation between the determined signal-to-noise distribution and the acquired magnetic resonance image can in particular involve correlating values or signal intensities of the signal-to-noise distribution with signal intensities or values of pixels or voxels of the acquired magnetic resonance image.

By means of the described aspect, in particular the effect of structured noise on the acquired magnetic resonance image can be taken into account. Moreover, even in the absence of a reference or empirical value, quality assurance can advantageously be performed on the basis of the deviation between the determined signal-to-noise distribution and the acquired magnetic resonance image.

In a further aspect of the method according to the disclosure, determining the signal-to-noise distribution for the parameter set of the magnetic resonance measurement on the basis of the predefined signal level of the phantom involves determining a deviation of the noise distribution and/or the signal-to-noise distribution from a reference noise distribution and/or a reference signal-to-noise distribution of a reference system having the same parameter set.

Determining the deviation between the noise distribution and/or the signal-to-noise distribution and the reference noise distribution and/or the reference signal-to-noise distribution can in particular involve taking a difference. For example, a difference is taken between signal intensities of individual pixels or voxels of the noise distribution and/or the signal-to-noise distribution and signal intensities of individual pixels or voxels of the reference noise distribution and/or the reference signal-to-noise distribution. However, it is equally conceivable for determining the deviation to involve normalizing, taking a mean deviation and/or a standard deviation. In addition, for determining the deviation, the noise distribution and/or the signal-to-noise distribution can also be correlated with the reference noise distribution and/or the reference signal-to-noise distribution.

By determining the deviation of the noise distribution and/or the signal-to-noise distribution from a reference noise distribution and/or a reference signal-to-noise distribution of a reference system with an identical parameter set, differences can be determined or quantified particularly precisely. This can advantageously simplify assessment of an error present in the receiving system.

In one aspect, the method according to the disclosure additionally comprises:
  determining the average value of the determined signal-to-noise distribution,
  wherein determining correct operation of the receiving system involves determining a deviation between the average value of the determined signal-to-noise distribution and the average value of a reference signal-to-noise distribution.

In particular, determining the average value of the signal-to-noise distribution of the acquired magnetic resonance image can also involve determining a statistical quantity. The average value of the signal-to-noise distribution can be determined according to a method described above. A statistical quantity can in particular include a standard deviation and/or a variance of signal intensities and/or a ratio of signal intensities of the signal to signal intensities of the noise. The average value of the signal-to-noise distribution of the acquired magnetic resonance image, as well as the statistical quantity, is preferably compared with an average value of a reference signal-to-noise distribution and/or a corresponding statistical quantity of a reference signal-to-noise distribution in order to determine correct operation of the receiving system.

The average value of the determined signal-to-noise distribution and statistical quantities describe essential characteristics of the noise of the acquired magnetic resonance image. In particular, the average value of the determined signal-to-noise distribution as well as the statistical quantity can be used in a particularly simple and/or time-efficient manner to determine a difference between the noise of the magnetic resonance image and a reference magnetic resonance image of a reference magnetic resonance measurement. Moreover, methods for determining the average value of the determined signal-to-noise distribution and/or the statistical quantity can advantageously be performed with little computational complexity.

According to a preferred aspect, the method according to the disclosure comprises: providing information relating to the determined noise distribution and/or information relating to correct operation of the receiving system by means of an output unit.

Providing the information relating to the determined noise distribution and/or information relating to correct operation of the receiving system can in particular involve storing the information on a storage unit of the magnetic resonance device and/or an external storage unit, such as, for example, a cloud and/or a storage unit of a server. In addition, the provision thereof can also involve outputting the information relating to the determined noise distribution and/or information relating to correct operation of the receiving system to an operator of the magnetic resonance device by means of a display unit and/or an output unit.

In one aspect, the computing unit of the magnetic resonance device is designed to obtain the information relating to the determined noise distribution and/or information relating to correct operation of the receiving system according to an aspect described above and automatically transmit the information to a storage unit and/or an output unit. It is conceivable for the information relating to the determined noise distribution and/or the information relating to correct operation of the receiving system to include an indication of a specific deviation from an expected result of the magnetic resonance measurement and/or a specific error of the receiving system. The information relating to the determined noise distribution and/or the information relating to correct operation of the receiving system can in particular be output to an operator of the magnetic resonance device, such as, for example, a medical staff member, a technician and/or a service person. It is also conceivable for the information to be provided to a control unit of the magnetic resonance device. The control unit can be designed to adjust a parameter and/or a parameter set of the magnetic resonance measurement to reduce unwanted noise affecting the magnetic resonance measurement.

By providing the information relating to the determined noise distribution and/or the information relating to correct operation of the receiving system, a fault in the receiving system can be documented in an advantageously time-efficient and/or automatic manner. In addition, the information relating to the determined noise distribution and/or the information relating to correct operation of the receiving system can be provided to the operator and/or the control unit of the magnetic resonance device in order to compensate for or facilitate the correction of one or more faults in the receiving system.

The magnetic resonance device according to the disclosure comprises a computing unit designed to coordinate a method according to an aspect described above and execute it by means of the magnetic resonance device.

For acquiring, processing and storing data such as, for example, magnetic resonance images, k-space data, information relating to the determined noise distribution and/or information relating to correct operation of a receiving system and the like, the magnetic resonance device can comprise further components in addition to the computing unit. For example, the magnetic resonance device can comprise a control unit, a main memory, a storage unit, and a suitable interface for inputting and outputting data. The computing unit can comprise, for example, a controller, a microcontroller, a CPU, a GPU or the like. The main memory and/or the memory unit can incorporate memory technologies such as, for example, RAM, ROM, PROM, EPROM, EEPROM, flash memory, but also HDD memory, SSD memory or the like. It is conceivable for the memory unit to constitute an internal database which is connected electrically, as well as mechanically, to the computing unit of the magnetic resonance device. However, it is equally conceivable for the storage unit to be an external database which is linked to the computing unit by means of a network connection. Examples of external storage units are network servers with corresponding data storage units as well as a cloud storage unit. The data can be transmitted using analog and/or digital signals as well as suitable wired and/or wireless signal links between the components of the magnetic resonance device.

The computing unit is preferably electrically connected to the control unit of the magnetic resonance device and/or incorporated in the control unit. The control unit can be designed to carry out a method according to the disclosure under the coordination of the computing unit. In particular, the control unit can be designed to perform a magnetic resonance measurement of a patient and/or a phantom, to acquire magnetic resonance signals of the patient and/or phantom by means of the receiving system, and to transmit the acquired magnetic resonance signals to the computing unit. In addition, the control unit can be designed to adjust parameters of the imaging examination under the coordination of the computing unit and/or an operator input.

In particular, the computing unit can be designed to determine a noise distribution of the acquired magnetic resonance image, perform a noise reduction procedure, generate an artificial magnetic resonance image, determine correct operation of the receiving system, determine a signal-to-noise distribution, and/or perform processing of acquired magnetic resonance signals or magnetic resonance images according to an aspect described above.

The components of the magnetic resonance device according to the disclosure can advantageously be matched to one another so as to ensure time-efficient and robust execution of a method according to the disclosure. In particular, the magnetic resonance device according to the disclosure can be designed to coordinate and perform a sequence of individual process steps autonomously. Consequently, correct operation of the receiving system can advantageously be determined automatically and/or without specific operator expertise. Moreover, the magnetic resonance device according to the disclosure shares the advantages of the inventive method according to an aspect described above.

BRIEF DESCRIPTION OF THE DRAWINGS

Further advantages and details will emerge from the following description of exemplary aspects with reference to the accompanying schematic drawings in which.

DETAILED DESCRIPTION

Figure 1:
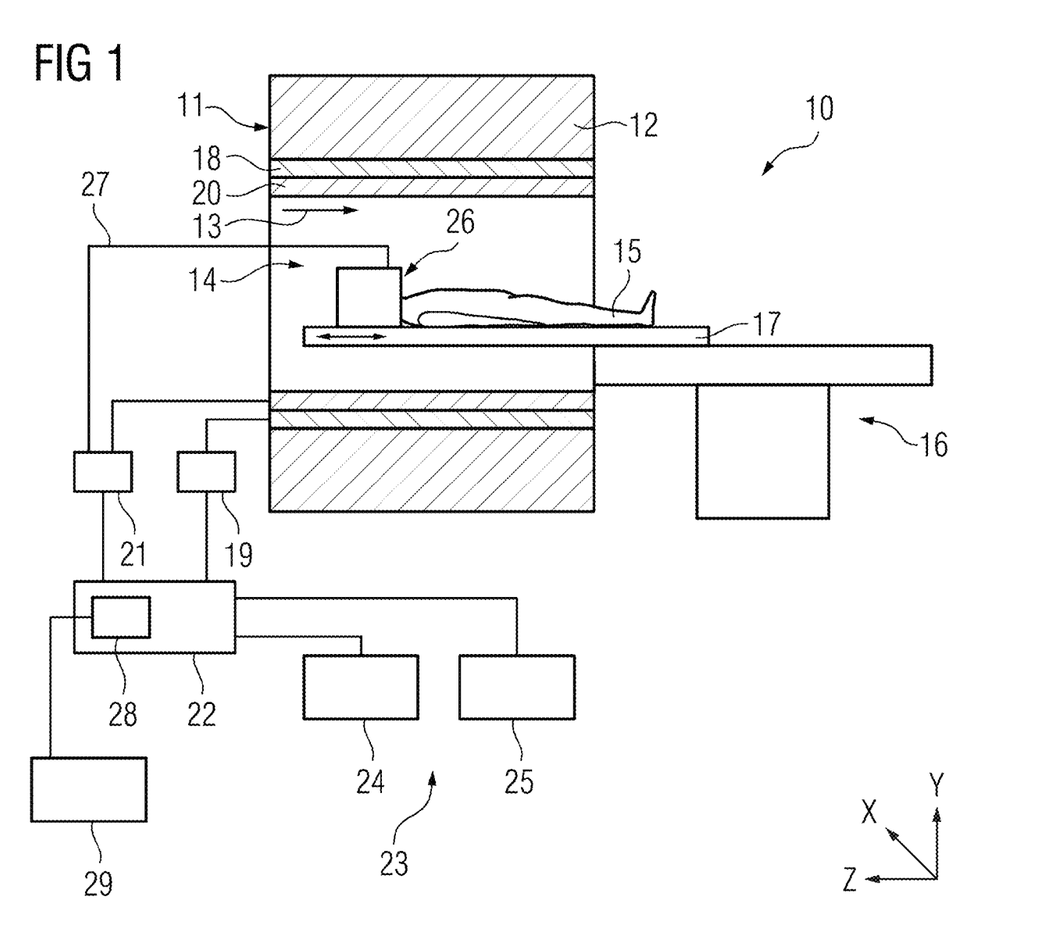
FIG. 1 schematically illustrates an aspect of a magnetic resonance device according to the disclosure, FIG. 2 schematically illustrates a possible aspect of a method according to the disclosure, FIG. 3 schematically illustrates a possible aspect of a method according to the disclosure, FIG. 4 schematically illustrates a possible aspect of a method according to the disclosure, and FIG. 5 schematically illustrates a possible aspect of a method according to the disclosure.

FIG. 1 shows a possible aspect of a magnetic resonance device 10 according to the disclosure. The magnetic resonance device 10 comprises a magnet unit 11 incorporating, for example, a permanent magnet, an electromagnet or a superconducting main magnet 12 for generating a powerful and, in particular, homogeneous main magnetic field 13 (B0 magnetic field). In addition, the magnetic resonance device 10 comprises a patient receiving region 14 for accommodating a patient 15 and/or a phantom (not shown). In this exemplary aspect, the patient receiving region 14 is cylindrical in shape and is circumferentially enclosed by the magnet unit 11. In principle, however, configurations of the patient receiving region 14 differing from this example are also conceivable.

The patient 15 and/or the phantom can be positioned in the patient receiving region 14 by means of a patient positioning device 16 of the magnetic resonance device 10. For this purpose, the patient positioning device 16 has a patient table 17 which is designed to be movable inside the patient receiving region 14. The magnet unit 11 additionally comprises a gradient coil 18 for generating magnetic gradient fields, which is used for spatial encoding during a magnetic resonance measurement. The gradient coil 18 is controlled by means of a gradient control unit 19 of the magnetic resonance device 10. The magnet unit 11 can additionally comprise a radiofrequency antenna which in this exemplary aspect is implemented as a body coil 20 fixedly incorporated in the magnetic resonance device 10. The body coil 20 is designed to excite atomic nuclei present in the main magnetic field 13 generated by the main magnet 12. The body coil 20 is controlled by a radiofrequency unit 21 of the magnetic resonance device 10 and injects radiofrequency signals into an examination space essentially constituted by the patient receiving region 14 of the magnetic resonance device 10. The body coil 20 can also be designed to receive magnetic resonance signals.

The magnetic resonance device 10 comprises a control unit 22 for controlling the main magnet 12, the gradient control unit 19 and the radiofrequency unit 21. The control unit 22 is designed to control the execution of a sequence, such as, for example, an imaging gradient echo sequence, a TSE sequence, or a UTE sequence. The control unit 22 additionally comprises a computing unit 28 designed to evaluate digitized magnetic resonance signals acquired during the magnetic resonance measurement.

In addition, the magnetic resonance device 10 comprises a user interface 23 which has a signal link to the control unit 22. Control information such as, for example, imaging parameters and reconstructed magnetic resonance images can be displayed to a user on an output unit 24, for example, on at least one monitor, of the user interface 23. The user interface 23 also comprises an input unit 25 by means of which magnetic resonance imaging parameters can be entered by an operator.

The magnetic resonance device 10 additionally comprises an arrangement of antennas designed as a head coil 26 which is positioned on the head of the patient 15 and transmits magnetic resonance signals from a volume of the head region to the magnetic resonance device 10. The head coil 26 preferably has an electrical connecting cable 27 that provides a signal link to the radiofrequency unit 21 and the control unit 22. Like the body coil 20, the head coil 26 can be designed to excite atomic nuclei and receive magnetic resonance signals. A transmitting unit of the head coil 26 is actuated by the radiofrequency unit 21 to emit radiofrequency signals. The head coil 26 can enclose the head of the patient 15 in an externally circumferential manner along a longitudinal axis of the patient 15. The components of the control unit 22, the radiofrequency unit 21, the electrical connecting cable 27, the head coil 26, and also the body coil 20 shown in FIG. 1 are at least sub-components of the receiving system of the magnetic resonance device 10. However, it is conceivable for the receiving system to comprise further or other components of the magnetic resonance device 10.

The magnetic resonance device 10 illustrated can self-evidently comprise further components normally present in magnetic resonance devices. It is equally conceivable that, instead of the cylindrical structure, the magnetic resonance device 10 has a C-shaped, triangular or asymmetrical structure of the magnetic field generating components. In particular, the magnetic resonance device 10 can be a dedicated magnetic resonance device 10 for performing magnetic resonance imaging of the jaw region of a standing or seated patient 15.

Figure 2:
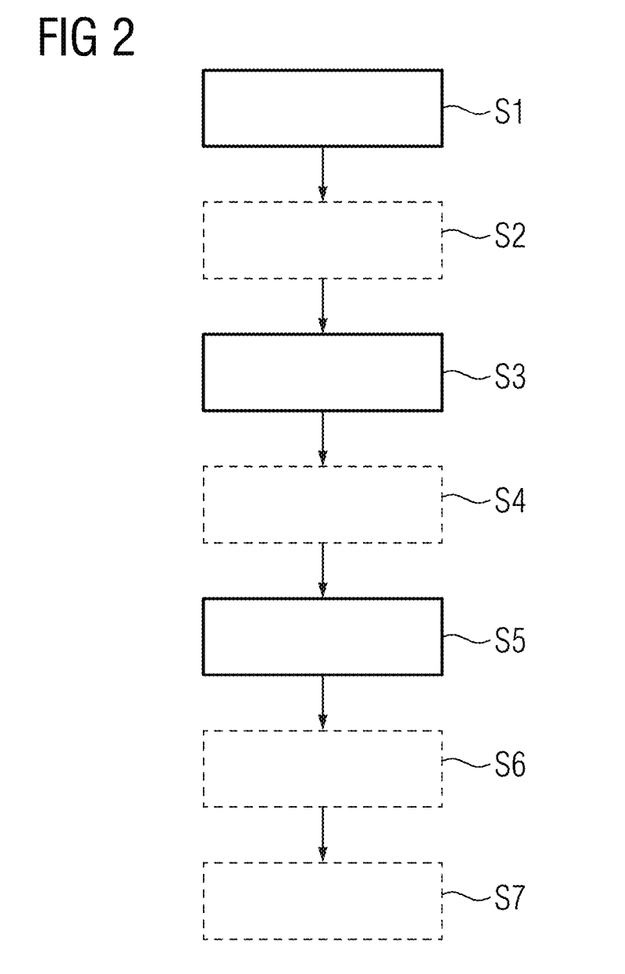

FIG. 2 shows a flow chart of a computer-implemented method according to the disclosure for determining correct operation of a receiving system of a magnetic resonance device 10 by means of a magnetic resonance measurement.

At the start of the method according to the disclosure, a patient 15 or a phantom is preferably positioned in the patient receiving region 14 of the magnetic resonance device 10.

In step S1, a magnetic resonance image 30 is acquired by means of the receiving system of the magnetic resonance device 10 during the magnetic resonance measurement. Acquiring the magnetic resonance image 30 preferably involves receiving magnetic resonance signals of the patient 15 or phantom from the patient receiving region 14 by means of an antenna of a local coil 26 and/or the body coil 20. The received magnetic resonance signals can be transmitted to a receiving unit (e.g. radiofrequency unit 21) of the magnetic resonance device 10 by means of an electrical connecting cable 27. The magnetic resonance signals are preferably amplified and digitized in the form of k-space data. The magnetic resonance image 30 can then be reconstructed on the basis of the k-space data by means of the computing unit 28.

It is conceivable for acquisition of the magnetic resonance image 30 by means of the receiving system to involve a magnetic resonance measurement of a phantom at a first point in time. By means of the magnetic resonance measurement of the phantom, a reference magnetic resonance image and/or a reference noise distribution 32b can be obtained. These can then be compared and/or correlated with magnetic resonance images 30 and/or noise distributions of a magnetic resonance measurement of a patient 15 at a second point in time to determine correct operation of the receiving system. The first point in time is preferably a number of hours, days, weeks or months prior to the second point in time.

In an optional step S2, a noise reduction method is applied to the acquired magnetic resonance image 30, and a noise-reduced magnetic resonance image 33 (See FIG. 3) is provided by means of the computing unit 28. The computing unit 28 preferably has an image processing algorithm that reduces noise on the basis of signal intensities of pixels or voxels of the magnetic resonance image 30. For example, the image processing algorithm can be designed to identify randomly fluctuating signal intensities of neighboring pixels or voxels, as well as image regions. The image processing algorithm can also be designed to adjust the signal intensities to compensate for such statistical fluctuations.

In step S3, the noise distribution 32 of the acquired magnetic resonance image 30 is determined by means of a computing unit 28. The computing unit 28 preferably comprises an image processing unit 28b which is designed to determine the noise distribution 32 of the acquired magnetic resonance image 30. The noise distribution 32 can be determined on the basis of an artificial magnetic resonance image 31 (see FIG. 4), an expected noise distribution, a noise-reduced magnetic resonance image 33 and/or the magnetic resonance image 30 itself. It is also conceivable for an external transmitting unit or a transmitting unit of the magnetic resonance device 10 to be designed to generate a predefined signal or noise, which is received by means of the receiving system. The difference between the generated noise and the received noise can be used for determining the noise of the receiving system.

In one aspect, determining the noise distribution 32 of the acquired magnetic resonance image 30 involves determining a deviation of the acquired magnetic resonance image 30 from an artificial magnetic resonance image 31 (see FIG. 4), wherein the artificial magnetic resonance image 31 is generated by simulating an imaging sequence of the magnetic resonance measurement and/or by means of an intelligent algorithm on the basis of the acquired magnetic resonance image 30. In particular, a simulation can involve a numerical calculation of Bloch equations. Properties of tissue of a diagnostically relevant body region of the patient 15 are preferably determined based on the acquired magnetic resonance image 30 and used as a boundary condition for the simulation.

In a further aspect, determining the noise distribution 32 of the acquired magnetic resonance image 30 involves determining a deviation between the acquired magnetic resonance image 30 and the noise-reduced magnetic resonance image 33, preferably taking the difference between signal intensities of pixels or voxels of the acquired magnetic resonance image 30 and signal intensities of pixels or voxels of the noise-reduced magnetic resonance image 33.

In another aspect, determining the noise distribution 32 of the acquired magnetic resonance image 30 involves filtering an image frequency of k-space data of the acquired magnetic resonance image 30, preferably filtering out the image frequencies from the k-space data that correspond to known or predefined frequencies of atomic nuclei of the tissue of the diagnostically relevant body region of the patient 15. The magnetic resonance image 30 determined on the basis of the filtered k-space data thus essentially exhibits noise and incorporates the noise distribution of the acquired magnetic resonance image 30.

It is also conceivable for the noise distribution 32 of the acquired magnetic resonance image 30 to be determined on the basis of a parameter set of the magnetic resonance measurement. This parameter set can be associated with the determined noise distribution 32 and/or a characteristic of the determined noise distribution 32, such as, for example, maximum noise level, standard deviation, power level, local distribution of the noise (variance), or the like. The determined noise distribution 32 and/or the characteristic of the determined noise distribution 32 and the parameter set are preferably stored in the form of a data structure on a memory unit and can be used as reference magnetic resonance measurements for further magnetic resonance measurements. In particular, it is conceivable for the parameter set and/or the characteristic of the determined noise distribution 32 to be used to identify a reference noise distribution 32*b* (see FIG. 5).

In an optional step S4, an expected noise distribution of the acquired magnetic resonance image 30 is determined. The expected noise distribution is preferably determined on the basis of a structure of the receiving system, a number and/or arrangement of used antennas of the local coil 26, a known receiving behavior of the antennas of the local coil 26, a known noise behavior of a preamplifier of the radiofrequency unit 21 and/or a diagnostically relevant body region of the patient 15.

In one aspect, the expected noise distribution of the acquired magnetic resonance image 30 is determined on the basis of at least one of the following: a decorrelation matrix, a sensitivity map of an antenna of the receiving system, a reference line of a parallel imaging technique, or an imaging parameter of the magnetic resonance measurement. For example, the expected noise distribution can be interpolated, extrapolated, or consulted in accordance with a database of reference noise distributions 32*b* on the basis of an imaging parameter or a parameter set.

In step S5, correct operation of the receiving system is determined by means of the computing unit 28 on the basis of the noise distribution 32. It is conceivable in particular for correct operation of the receiving system during a magnetic resonance measurement of a patient 15 to be determined on the basis of: the deviation between the acquired magnetic resonance image 30 and the noise-reduced magnetic resonance image 33, the deviation between the acquired magnetic resonance image 30 and the artificial magnetic resonance image 31, a deviation between the noise distribution 32*a* of the magnetic resonance image 30 and the expected noise distribution of the magnetic resonance image 30, and/or a deviation between the noise distribution 32*a* of the acquired magnetic resonance image and a reference noise distribution 32*b*.

When using a phantom, determining correct operation of the receiving system can in particular involve a. determining a signal-to-noise distribution for the parameter set of the magnetic resonance measurement on the basis of a predefined signal level of the phantom, b. determining a deviation of the predefined signal level of the phantom using a reference value of the signal level for the parameter set, c. determining a deviation between the determined signal-to-noise distribution and the acquired magnetic resonance image 30 and/or d. determining a deviation between the average value of the signal-to-noise distribution and the average value of a reference noise distribution 32.

As described above, the computing unit 28 can use magnetic resonance images 30 and/or noise distributions 32 acquired by means of a phantom as reference magnetic resonance images and/or reference noise distributions 32*b* to verify that the receiving system is operating correctly. Preferably, however, reference magnetic resonance images and/or reference noise distributions 32*b* of other patients 15 are used in determining correct operation of the receiving system during a magnetic resonance measurement of a patient 15.

In optional step S6, the determined signal-to-noise distribution is averaged. The computing unit 28 compares, for example, the average value of the signal-to-noise distribution of the acquired magnetic resonance image 30 with an average value of a reference signal-to-noise distribution. In particular, a difference or deviation between the average value of the determined signal-to-noise distribution and the average value of the reference signal-to-noise distribution can be determined.

In the additional optional step S7, information relating to the determined noise distribution 32 and/or information relating to correct operation of the receiving system is provided by means of an output unit 24. Providing this information preferably comprises outputting the information relating to the determined noise distribution 32 and the information relating to correct operation of the receiving system to an operator of the magnetic resonance device 10 by means of the output unit 24. In addition, the information relating to the determined noise distribution and the information relating to correct operation of the receiving system can also be stored on the storage unit 29 of the magnetic resonance device 10 or an external storage unit.

Figure 3:
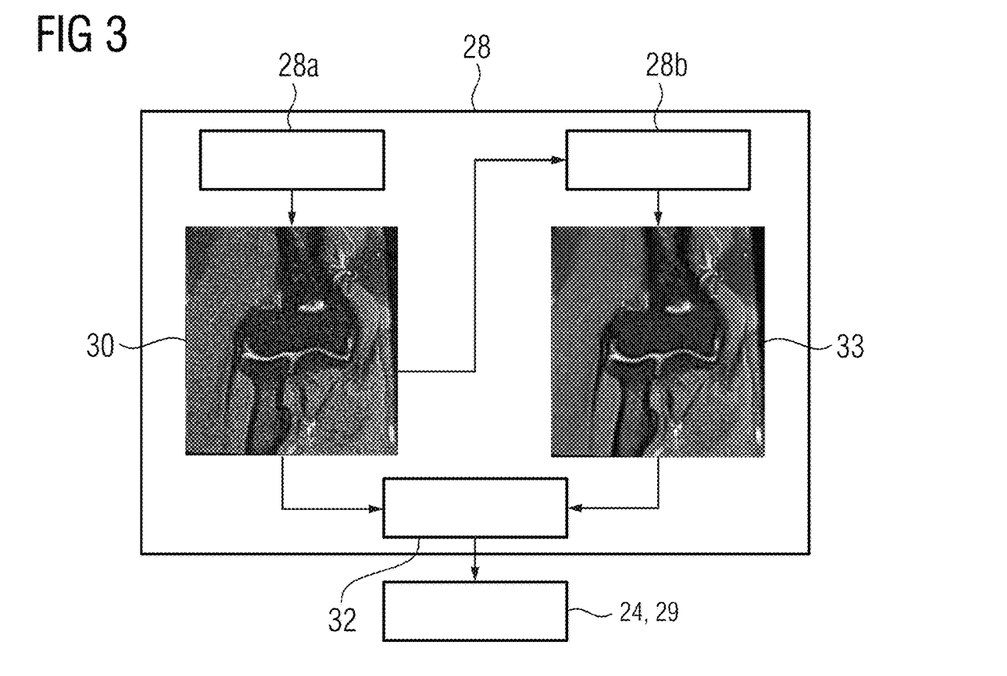

FIG. 3 shows a possible aspect of a method according to the disclosure, in which an image processing algorithm of an image processing unit 28*b* generates a noise-reduced magnetic resonance image 33 on the basis of the acquired magnetic resonance image 30*a*. The acquired magnetic resonance image 30 is reconstructed by an image reconstruction unit 28*a* of the computing unit 28 on the basis of k-space data. By taking the difference between the acquired magnetic resonance image 30 and the noise-reduced magnetic resonance image 33, the computing unit 28 determines the noise distribution 32 which in this example is provided to the output unit 24 and also to the storage unit 29.

In one aspect, instead of the noise-reduced magnetic resonance image 33, a reference magnetic resonance image 30b (not shown) can be read in from the memory unit 29. As shown in FIG. 3, the computing unit 28 can determine a deviation between the acquired magnetic resonance image 30 and the reference magnetic resonance image 30b in order to establish the noise distribution 32. A suitable reference magnetic resonance image 30b can be read in, in particular, on the basis of a parameter or a parameter set of the magnetic resonance measurement.

Figure 4:
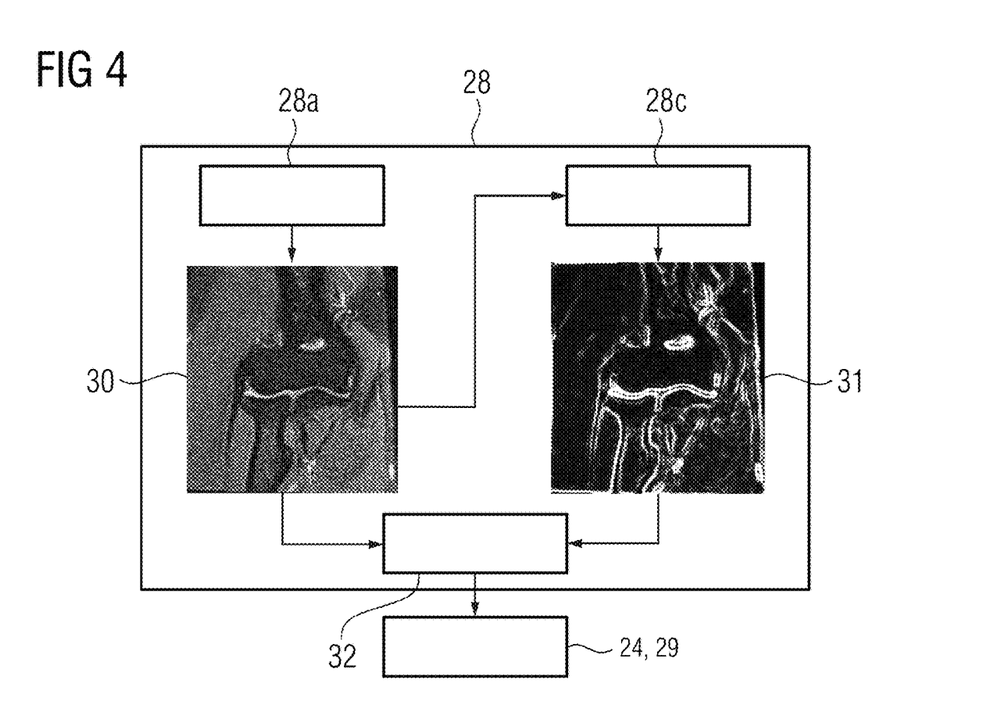

FIG. 4 shows an alternative aspect of a method according to the disclosure, in which a simulation unit 28c generates an artificial magnetic resonance image 31 on the basis of the acquired magnetic resonance image 30. Here, organs or tissue structures of the acquired magnetic resonance image 30 can be segmented and properties of segmented sections of the tissue structures, such as, for example, density, composition, and/or elasticity, can be transmitted to the simulation unit 28c. As described previously, the acquired magnetic resonance image 30 is reconstructed by the image reconstruction unit 28a of the computing unit 28. By establishing the difference between the acquired magnetic resonance image 30 and the artificial magnetic resonance image 31, the computing unit 28 determines the noise distribution 32, which in this example is provided to the output unit 24 as well as the storage unit 29.

In one aspect, the simulation unit can also have an intelligent algorithm which is designed to calculate a representation of the body region on the basis of the acquired magnetic resonance image 30.

Figure 5:
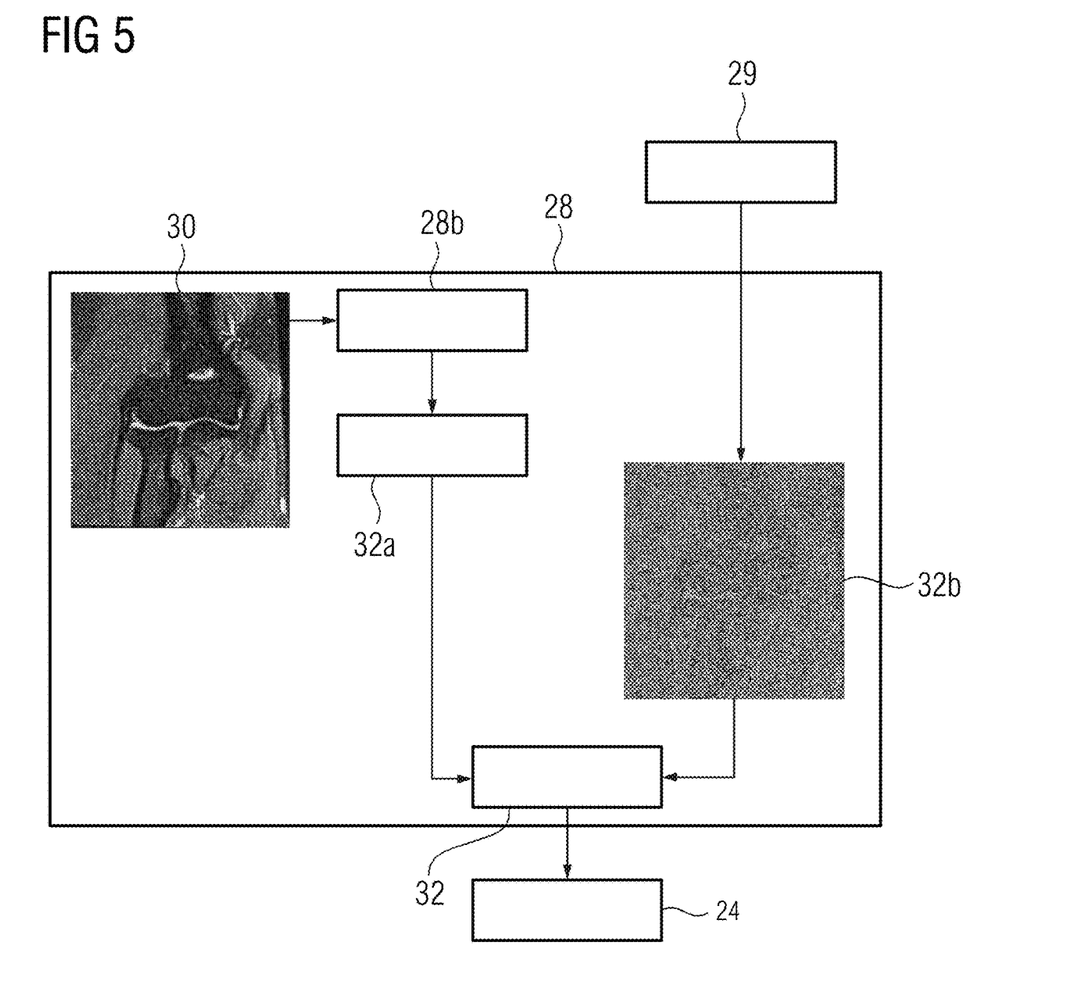

FIG. 5 shows another aspect of a method according to the disclosure, in which a reference noise distribution 32b is transmitted from the storage unit 29 to the computing unit 28. In this case, the reference noise distribution 32b contains both random (thermal) noise and structured noise which can be seen in an outline of the diagnostically relevant body region of the patient 15. Alternatively, the reference noise distribution 32b can also be rendered free of structured noise. In this case, the reference noise distribution 32b includes a number of pixels with signal intensities which are represented as one image. Here, the computing unit 28 comprises an image processing unit 28b which determines the noise distribution 32a in accordance with an aspect described above on the basis of the acquired magnetic resonance image 30a. To determine correct operation of the receiving system, the computing unit 28 takes a difference between the noise distribution 32a and the reference noise distribution 32b. In the example shown, the information relating to correct operation of the receiving system is output to the operator of the magnetic resonance device 10 by means of the output unit 24.

It should be noted that the methods and setups described above serve merely as exemplary aspects, and that the basic principle can also be varied in many areas by persons skilled in the art without departing from the scope of the disclosure as set forth in the claims. Moreover, the method described is not limited to medical applications or the described sequence of method steps. It is also pointed out for the sake of completeness that the use of the indefinite articles "a" or "an" does not exclude the possibility of the features in question also being present more than once. Likewise, the term "unit" does not exclude the possibility of the latter consisting of a plurality of components which can also be spatially distributed.

The invention claimed is:

1. A computer-implemented method for determining correct operation of a receiving system of a magnetic resonance device using a magnetic resonance measurement, comprising:
   acquiring a magnetic resonance image using the receiving system during the magnetic resonance measurement;
   applying a noise reduction method to the acquired magnetic resonance image using a computing unit to generate a noise-reduced magnetic resonance image;
   determining a noise distribution of the acquired magnetic resonance image using the computing unit, wherein the determining the noise distribution of the acquired magnetic resonance image comprises determining a deviation between the acquired magnetic resonance image and the noise-reduced magnetic resonance image; and
   determining correct operation of the receiving system using the computing unit based on the noise distribution, wherein the correct operation of the receiving system is determined based on the deviation between the acquired magnetic resonance image and the noise-reduced magnetic resonance image.

2. The method as claimed in claim 1, wherein the determining the noise distribution of the acquired magnetic resonance image comprises filtering an image frequency of k-space data of the acquired magnetic resonance image.

3. The method as claimed in claim 1, further comprising:
   determining an expected noise distribution of the acquired magnetic resonance image, wherein the determining the expected noise distribution of the acquired magnetic resonance image is performed based on a decorrelation matrix, a sensitivity map of an antenna of the receiving system, a reference line of a parallel imaging technique, or an imaging parameter of the magnetic resonance measurement,
   wherein the correct operation of the receiving system is determined based on a deviation between the noise distribution of the acquired magnetic resonance image and the expected noise distribution of the acquired magnetic resonance image.

4. The method as claimed in claim 1,
   wherein the correct operation of the receiving system is determined based on a deviation between the noise distribution of the acquired magnetic resonance image and a reference noise distribution, and
   wherein the reference noise distribution comprises a known noise distribution for a specific parameter set of the magnetic resonance measurement.

5. The method as claimed in claim 1, further comprising:
   providing information relating to the determined noise distribution and/or information relating to correct operation of the receiving system using an output unit.

6. A computer-implemented method for determining correct operation of a receiving system of a magnetic resonance device using a magnetic resonance measurement, comprising:
   acquiring a magnetic resonance image using the receiving system during the magnetic resonance measurement;
   determining a noise distribution of the acquired magnetic resonance image using a computing unit, wherein the determining the noise distribution of the acquired magnetic resonance image comprises determining a deviation of the acquired magnetic resonance image from an artificial magnetic resonance image, wherein the artificial magnetic resonance image is created using:
      a simulation of an imaging sequence of the magnetic resonance measurement, and/or an intelligent algorithm based on the acquired magnetic resonance image; and determining correct operation of the receiving system using the computing unit based on the noise distribution, wherein the correct operation of the receiving system is determined based on the deviation between the acquired magnetic resonance image and the artificial magnetic resonance image.

7. A computer-implemented method for determining correct operation of a receiving system of a magnetic resonance device using a magnetic resonance measurement, comprising:

acquiring a magnetic resonance image using the receiving system during the magnetic resonance measurement;

determining a noise distribution of the acquired magnetic resonance image using a computing unit;

determining an expected noise distribution of the acquired magnetic resonance image; and determining the correct operation of the receiving system using the computing unit based on the noise distribution, wherein the correct operation of the receiving system is determined based on a deviation between the noise distribution of the acquired magnetic resonance image and the expected noise distribution of the acquired magnetic resonance image.

8. A computer-implemented method for determining correct operation of a receiving system of a magnetic resonance device using a magnetic resonance measurement, comprising:

acquiring a magnetic resonance image using the receiving system during the magnetic resonance measurement, wherein the acquiring the magnetic resonance image using the receiving system comprises acquiring a magnetic resonance image of a phantom;

determining a noise distribution of the acquired magnetic resonance image using a computing unit, wherein the noise distribution of the acquired magnetic resonance image is determined based on a parameter set of the magnetic resonance measurement; and determining correct operation of the receiving system using the computing unit based on the noise distribution, wherein the determining the correct operation of the receiving system comprises determining a signal-to-noise distribution for the parameter set of the magnetic resonance measurement based on a predefined signal level of the phantom.

9. The method as claimed in claim 8, wherein the determining the correct operation of the receiving system comprises determining a deviation of the predefined signal level of the phantom using a reference value of the signal level for the parameter set.

10. The method as claimed in claim 8, wherein the determining the correct operation of the receiving system comprises determining a deviation between the determined signal-to-noise distribution and the acquired magnetic resonance image.

11. The method as claimed in claim 8, wherein the determining the signal-to-noise distribution for the parameter set of the magnetic resonance measurement based on the predefined signal level of the phantom comprises determining a deviation of the noise distribution and/or the signal-to-noise distribution from a reference noise distribution and/or a reference signal-to-noise distribution of a reference system having an identical parameter set.

12. The method as claimed in claim 8, further comprising:

determining an average value of the determined signal-to-noise distribution, wherein the determining the correct operation of the receiving system comprises determining a deviation between the average value of the signal-to-noise distribution and an average value of a reference signal-to-noise distribution.

\* \* \* \* \*